(12) United States Patent
Tanaka et al.

(10) Patent No.: US 8,786,738 B2
(45) Date of Patent: Jul. 22, 2014

(54) IMAGE SENSING APPARATUS AND METHOD OF CONTROLLING OPERATION OF SAME

(71) Applicant: FUJIFILM Corporation, Tokyo (JP)

(72) Inventors: Seiji Tanaka, Saitama (JP); Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/923,755

(22) Filed: Jun. 21, 2013

(65) Prior Publication Data

US 2013/0286261 A1 Oct. 31, 2013

Related U.S. Application Data

(63) Continuation of application No. PCT/JP2011/067916, filed on Jul. 29, 2011.

(30) Foreign Application Priority Data

Mar. 11, 2011 (JP) .................................. 2011-054685
Jul. 25, 2011 (JP) .................................. 2011-162216

(51) Int. Cl.
*H04N 5/335* (2011.01)
*H04N 3/14* (2006.01)

(52) U.S. Cl.
USPC .......... 348/272; 348/294; 348/222.1; 257/433

(58) Field of Classification Search
CPC .......... H04N 5/23229; H04N 5/23232; H04N 5/2258; H04N 5/343; H04N 9/045; H04N 9/09
USPC .................................. 348/49, 222.1, 273, 294
See application file for complete search history.

(56) References Cited

U.S. PATENT DOCUMENTS 5,798,796 A * 8/1998 Sugiyama ................ 375/240.04
6,995,796 B2 2/2006 Taubman
(Continued)

FOREIGN PATENT DOCUMENTS

EP 1 148 712 A2 10/2001
JP 62-503068 A 12/1987
(Continued)

OTHER PUBLICATIONS

International Search Report issued in PCT/JP2011/067916, dated Oct. 25, 2011.

(Continued)

*Primary Examiner* — Hung Lam
(74) *Attorney, Agent, or Firm* — Birch, Stewart, Kolasch & Birch, LLP.

(57) ABSTRACT

At least one green filter G having a filter characteristic for transmitting a green light component is formed in all of horizontal, vertical and diagonal directions in a block consisting of six optoelectronic transducers in each of the horizontal and vertical directions. Further, at least one blue filter B and red filter R having filter characteristics for transmitting a blue light component and a red light component are formed in the horizontal and vertical directions. Even an image obtained after ½ subsampling along each of the horizontal and vertical directions will contain pixels having a green component in all of the horizontal, vertical and diagonal directions in blocks of 6×6 pixels. The precision of reproducibility in interpolation processing is thus improved.

9 Claims, 10 Drawing Sheets

(56) References Cited

U.S. PATENT DOCUMENTS

| | | |
|---|---|---|
| 2002/0149686 A1 | 10/2002 | Taubman |
| 2003/0133028 A1* | 7/2003 | Morinaka et al. ............. 348/273 |
| 2004/0109068 A1 | 6/2004 | Mitsunaga et al. |
| 2004/0169747 A1 | 9/2004 | Ono et al. |
| 2006/0203113 A1 | 9/2006 | Wada et al. |
| 2007/0013786 A1 | 1/2007 | Chiba et al. |
| 2007/0153104 A1 | 7/2007 | Ellis-Monaghan et al. |
| 2008/0151083 A1 | 6/2008 | Hains et al. |
| 2010/0182482 A1 | 7/2010 | Tanaka et al. |
| 2011/0063482 A1* | 3/2011 | Kim et al. ..................... 348/273 |
| 2011/0069189 A1 | 3/2011 | Venkataraman et al. |
| 2012/0025060 A1 | 2/2012 | Iwata |
| 2012/0092535 A1* | 4/2012 | Masuno et al. ............... 348/278 |
| 2013/0120623 A1* | 5/2013 | Kim .............................. 348/294 |
| 2013/0134537 A1* | 5/2013 | Nakajiki et al. .............. 257/432 |
| 2013/0194449 A1* | 8/2013 | Suzuki ....................... 348/222.1 |
| 2013/0222553 A1* | 8/2013 | Tsuchita ......................... 348/49 |

FOREIGN PATENT DOCUMENTS

| | | | |
|---|---|---|---|
| JP | 8-23542 | A | 1/1996 |
| JP | 8-23543 | A | 1/1996 |
| JP | 11-285012 | A | 10/1998 |
| JP | 2000-308080 | A | 11/2000 |
| JP | 2004-221839 | A | 8/2004 |
| JP | 2004-266369 | A | 9/2004 |
| JP | 2005-136766 | A | 5/2005 |
| JP | 2007-37104 | A | 2/2007 |
| JP | 2007164904 | A | 7/2007 |
| JP | 2007-506490 | A | 11/2007 |
| JP | 4019417 | B2 | 12/2007 |
| JP | 4088989 | B2 | 5/2008 |
| JP | 2008-236620 | A | 10/2008 |
| JP | 2009-49533 | A | 3/2009 |
| JP | 2010-512048 | A | 4/2010 |
| JP | 2010-153511 | A | 7/2010 |
| JP | 2011-523538 | A | 8/2011 |
| WO | WO 02/056604 | A1 | 7/2002 |
| WO | WO 2008/066698 | A2 | 6/2008 |
| WO | WO 2009/151903 | A2 | 12/2009 |

OTHER PUBLICATIONS

Written Opinion of the International Searching Authority issued in PCT/JP2011/067916, dated Oct. 25, 2011.
Supplementary European Search Report issued on Apr. 10, 2014 in European Application No. 11861172.2.

* cited by examiner

IMAGE SENSING APPARATUS AND METHOD OF CONTROLLING OPERATION OF SAME

CROSS REFERENCE TO RELATED APPLICATIONS

This application is a Continuation of PCT International Application No. PCT/JP2011/067916 filed on Jul. 29, 2011, which claims priority under 35 U.S.C. §119(a) to Patent Application No. 2011-054685 filed in Japan on Mar. 11, 2011 and to Patent Application No. 2011-162216 filed in Japan on Jul. 25, 2011, all of which are hereby expressly incorporated by reference into the present application.

TECHNICAL FIELD

This invention relates to an image sensing apparatus and to a method of controlling the operation of this apparatus.

BACKGROUND ART

FIG. 8a illustrates part of the photoreceptor surface of a solid-state electronic image sensing device 1. The solid-state electronic image sensing device 1 is provided with a number of optoelectronic transducers 2 in the horizontal and vertical directions. Formed on the photoreceptor surfaces of the optoelectronic transducers 2 are color filters R having a characteristic that transmits a light component of the color red, color filters G having a characteristic that transmits a light component of the color green, or color filters B having a characteristic that transmits a light component of the color blue. In FIG. 8a, the color filters R, G or B are formed on the photoreceptor surfaces of the optoelectronic transducers 2 in an array referred to as the "Bayer array". FIG. 8b illustrates the manner in which an image having a period that corresponds to three columns of the optoelectronic transducers 2 of the solid-state electronic image sensing device 1 is formed on the solid-state electronic image sensing device 1. The level of the white-color portions is 255 if expressed by eight bits and the level of the portions indicated by the hatching is 0 if expressed by eight bits. If subsampling processing, which is for reading out signal charge that has accumulated in a (3n+1)th row (where n is a positive integer), is executed in a case where such an image has been formed, high-frequency components repeat and a bright, flat Moiré image is produced, as shown in FIG. 8c.

FIG. 9 illustrates one row of optoelectronic transducers of the solid-state electronic image sensing device 1 shown in FIG. 8a. Signal charge that has accumulated in optoelectronic transducers 2 on which color filters having identical characteristics have been formed are mixed along the horizontal direction. Since every other color filter has the same characteristic, the resolution of the image after the pixels are mixed declines as if it were passed through a low-pass filter.

Furthermore, if, in a case where an image having a period that corresponds to the columns of the optoelectronic transducers 2 of the solid-state electronic image sensing device 1 is formed on the solid-state electronic image sensing device 1, as shown in FIG. 10a, signal charge is mixed every block of 3×3 pixels of the optoelectronic transducers 2, as shown in FIG. 10b, then the red level within the block will be 255 in terms of eight bits, the green level will be 128 in terms of eight bits, and the blue level will be 0, and an orange color (represented by the characters Or) will result (a color Moiré), as depicted in FIG. 10c.

Conventionally, the occurrence of color Moiré is suppressed by placing an optical low-pass filter in front of the photoreceptor surface of the solid-state electronic image sensing device and removing the high-frequency components of the image of the subject. However, there is a decline in resolution.

In order to deal with this, there is a technique (Japanese Patent Application Laid-Open No. 2000-308080) in which the filter array of the solid-state electronic image sensing devices is made a three-color random array that satisfies an array limit condition, namely that any pixel of interest adjoin three colors, which include the color of this pixel of interest, at any of four sides of this pixel of interest. However, it is necessary to optimize synchronization processing for every random pattern. This is troublesome. In addition, this technique is not effective in dealing with false colors ascribable to high-frequency components.

Further, there is a sensor (Japanese Patent Application Laid-Open No. 2005-136766) having a plurality of filters of different spectral sensitivities, in which first and second filters among these are arranged alternately at a first predetermined period along one diagonal direction of an image grid and alternately at a second predetermined period only the other diagonal direction. However, the precision of pixel reproduction is not high.

Further, there is a technique (U.S. Pat. No. 4,019,417) in which two each of pixels having green color components are formed along each of the horizontal and vertical directions. However, since these have different sensitivities, a sensitivity adjustment is required in a case where pixels having green color components are utilized.

Furthermore, there are techniques such as a technique (U.S. Pat. No. 4,088,959) that mentions an array of color filters; a technique (Japanese Patent Publication No. 62-503068) in which two each of optoelectronic transducers on which filters having a green light-transmitting characteristic have been formed are arranged along the horizontal and vertical directions; a technique (Japanese Patent Application Laid-Open No. 2009-49533) in which a G pixel is always included every other column; and techniques (Japanese Patent Application Laid-Open Nos. 8-023542 and 8-023543) in which the number of G pixels is increased in comparison with the Bayer array. Furthermore, problems result also in cases where, owing to subsampling of pixels, the amount of data is reduced and the frame rate raised.

Disclosure of the Invention

An object of the present invention is to achieve higher resolution even in cases where pixels are subsampled.

An image sensing apparatus according to the present invention is characterized by comprising: a solid-state electronic image sensing device having a number of optoelectronic transducers arrayed in horizontal and vertical directions, wherein color filters having filter characteristics for transmitting a light component of any color among colors red, green and blue or a light component of any color among colors cyan, magenta and yellow are formed on photoreceptor surfaces of the optoelectronic transducers, the number of the optoelectronic transducers on the photoreceptor surfaces of which the color filters having the filter characteristic for transmitting the green light component are formed is greater than the number of the optoelectronic transducers on the photoreceptor surfaces of which the color filters having the filter characteristic for transmitting the red light component are formed or the number of the optoelectronic transducers on the photoreceptor surfaces of which the color filters having the filter characteristic for transmitting the blue light component are formed, or the number of the optoelectronic transducers on the photoreceptor surfaces of which the color filters having the filter characteristic for transmitting the yellow light component are formed is greater than the number of the optoelectronic transducers on the photoreceptor surfaces of which the color filters having the filter characteristic for transmitting the cyan light component are formed or the number of the optoelectronic transducers on the photoreceptor surfaces of which the color filters having the filter characteristic for transmitting the magenta light component are formed, and in a block consisting of six of the optoelectronic transducers in each of the horizontal and vertical directions, at least one each of a color filter having a filter characteristic for transmitting a green light component, a color filter having a filter characteristic for transmitting a blue light component and a color filter having a filter characteristic for transmitting a red light component, or at least one each of a color filter having a filter characteristic for transmitting a yellow light component, a color filter having a filter characteristic for transmitting a cyan light component and a color filter having a filter characteristic for transmitting a magenta light component, are formed in all horizontal and vertical directions and, by repeating this block periodically, color filters having a filter characteristic for transmitting a green light component or a yellow light component are formed diagonally, signal charge that has accumulated in the optoelectronic transducers being output as a video signal; and a driving circuit for driving the solid-state electronic image sensing device so as to output, from within the video signal that is output from the solid-state electronic image sensing device, a video signal obtained based upon signal charge that has accumulated in every other odd-numbered one of the optoelectronic transducers in each of the horizontal and vertical directions.

The present invention also provides an operation control method suited to the above-described image sensing apparatus. Specifically, the invention provides a method comprises: a solid-state electronic image sensing device, which has a number of optoelectronic transducers arrayed in horizontal and vertical directions, outputting signal charge, which has accumulated in the optoelectronic transducers, as a video signal, wherein color filters having a filter characteristic for transmitting a light component of any color among colors red, green and blue or a light component of any color among colors cyan, magenta and yellow are formed on photoreceptor surfaces of the optoelectronic transducers, the number of the optoelectronic transducers on the photoreceptor surfaces of which the color filters having the filter characteristic for transmitting the green light component are formed is greater than the number of the optoelectronic transducers on the photoreceptor surfaces of which the color filters having the filter characteristic for transmitting the red light component are formed or the number of the optoelectronic transducers on the photoreceptor surfaces of which the color filters having the filter characteristic for transmitting the blue light component are formed, or the number of the optoelectronic transducers on the photoreceptor surfaces of which the color filters having the filter characteristic for transmitting the yellow light component are formed is greater than the number of the optoelectronic transducers on the photoreceptor surfaces of which the color filters having the filter characteristic for transmitting the cyan light component are formed or the number of the optoelectronic transducers on the photoreceptor surfaces of which the color filters having the filter characteristic for transmitting the magenta light component are formed, and in a block consisting of six of the optoelectronic transducers in each of the horizontal and vertical directions, at least one each of a color filter having a filter characteristic for transmitting a green light component, a color filter having a filter characteristic for transmitting a blue light component and a color filter having a filter characteristic for transmitting a red light component, or at least one each of a color filter having a filter characteristic for transmitting a yellow light component, a color filter having a filter characteristic for transmitting a cyan light component and a color filter having a filter characteristic for transmitting a magenta light component, are formed in all horizontal and vertical directions and, by repeating this block periodically, color filters having a filter characteristic for transmitting a green light component or a yellow light component are formed diagonally; and a driving circuit driving the solid-state electronic image sensing device so as to output, from within the video signal that is output from the solid-state electronic image sensing device, a video signal obtained based upon signal charge that has accumulated in every other odd-numbered one of the optoelectronic transducers in each of the horizontal and vertical directions.

In accordance with the present invention, with regard to pixels having a green or yellow light component from among pixels that constitute an image represented by a video signal that is output from a solid-state electronic image sensing device, it is arranged so that these pixels are included in all horizontal, vertical and diagonal directions in a block consisting of six pixels in both the horizontal and vertical directions, in the same manner as an array of color filters, which have a characteristic that transmits a green or yellow light component, formed on the photoreceptor surfaces of optoelectronic transducers that construct a solid-state electronic image sensing device. The image represented by a video signal that is output from the solid-state electronic image sensing device is such that there is an improvement in the precision of reproducibility of interpolation processing in the high-frequency region.

The above-mentioned block is a group of four sub-blocks each consisting of three of the optoelectronic transducers in each of the horizontal and vertical directions. In this case, from among the color filters formed on the photoreceptor surfaces of the optoelectronic transducers, an array of color filters having a characteristic for transmitting a red or cyan light component and an array of color filters having a characteristic for transmitting a blue or magenta light component would be the reverse of each other in sub-blocks adjacent in the horizontal direction and in the vertical direction.

It may be arranged so as to include at least one portion in which two color filters, which have a characteristic for transmitting a green or yellow light component, formed on the photoreceptor surfaces of the optoelectronic transducers contained in the block are contiguous in all of the horizontal, vertical and diagonal directions.

It may be arranged so as to include at least one portion in which two color filters each, which have a characteristic for transmitting a green or yellow light component, formed on the photoreceptor surfaces of the optoelectronic transducers contained in the block are contiguous in the horizontal and vertical directions.

The apparatus may further comprise: a correlation direction detection device (correlation direction detection means) for detecting a correlation direction from pixel levels of four pixels obtained based upon a portion in which two of the color filters each, which have a characteristic for transmitting a green or yellow light component, formed on the photoreceptor surfaces of the optoelectronic transducers contained in the block are contiguous in the horizontal and vertical directions; an interpolation device (interpolation means) for interpolating a green or yellow component of a pixel having a red, cyan, blue or magenta component, which exists in the correlation direction detected in the correlation direction detection device, by using a pixel having a green or yellow component that exists in the correlation direction detected in the correlation direction detection device; and a control device (control means) for repeating processing by the correlation direction detection device and processing by the interpolation device with regard to one image portion.

By way of example, the correlation direction detection device calculates an absolute value of a difference between pixel levels of adjacent pixels in every one of the horizontal, vertical and diagonal directions and decides that a direction along which the sum total or average value of the absolute values of the differences in every direction is smallest is the correlation direction.

By way of example, the interpolation device interpolates a color component, which does not have a color component among pixels having the red, cyan, blue or magenta color component, from a green or yellow color component interpolated by the interpolation device and a color component having a color component among pixels having the red, cyan, blue or magenta color component.

It is preferred that the optoelectronic transducers on which the color filters having the characteristic for transmitting the green or yellow light component are formed have equal sensitivities.

BEST MODE FOR CARRYING OUT THE INVENTION

Figure 1:
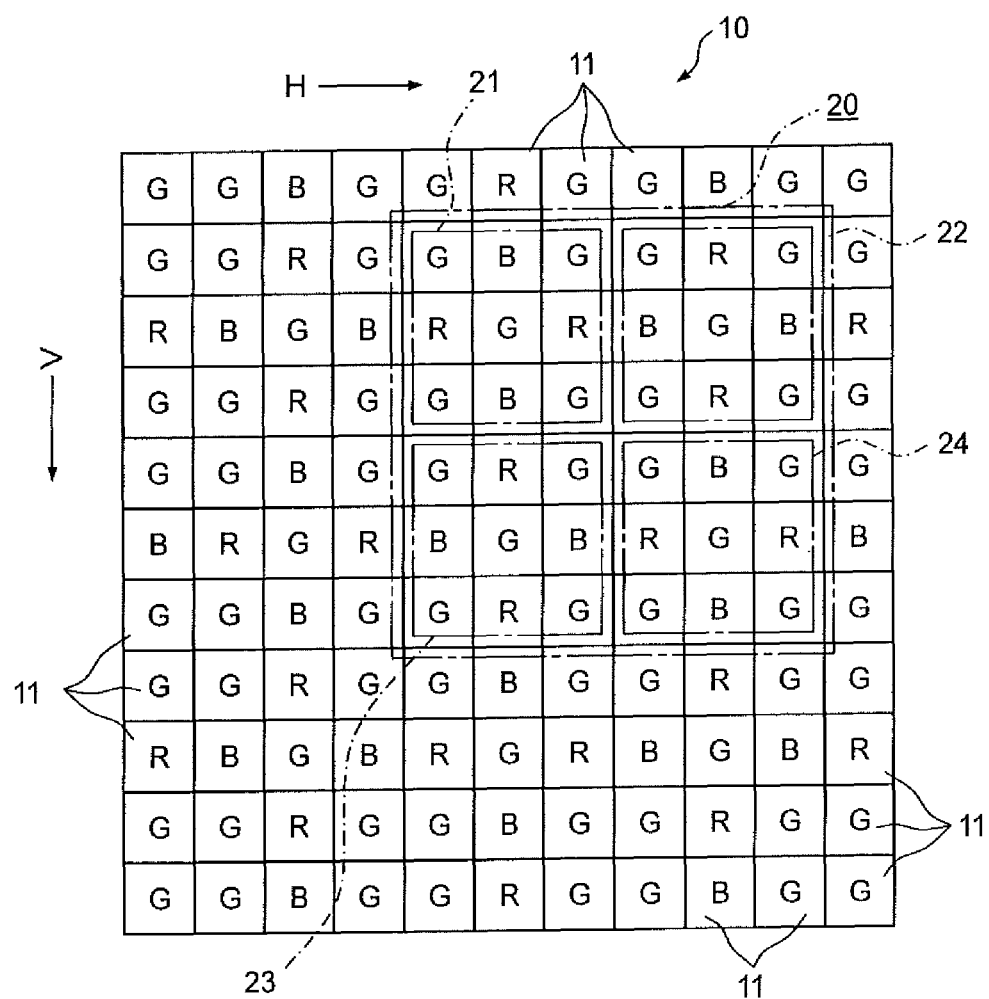
FIG. 1 illustrates part of the photoreceptor surface of a CCD.

FIG. 1 illustrates part of the photoreceptor surface of a CCD (which may be another solid-state electronic image sensing device such as a C-MOS) 10 according to an embodiment of the present invention.

A number of optoelectronic transducers 11 are arrayed in the horizontal direction (indicated by arrow H) and vertical direction (indicated by arrow V). The sensitivities of these optoelectronic transducers 11 are all equal (the sensitivities of optoelectronic transducers on which filters for transmitting at least a green light component have been formed are equal). Formed on the photoreceptor surfaces of the optoelectronic transducers 11 are color filters R, G or B having characteristics for transmitting red, green or blue (which may just as well be cyan, yellow or magenta) light components. A red filter having a characteristic for transmitting the red light component is indicated by character R, a green filter having a characteristic for transmitting the green light component by character G, and a blue filter having a characteristic for transmitting the blue light component by character B.

If consideration is given to a block 20 consisting of six optoelectronic transducers in each of the horizontal and vertical directions, the block 20 will contain at least one green filter G, one blue filter B and one red filter R. By repeating such a block 20 in the horizontal and vertical directions, at least one green filter G will be formed along all of the horizontal, vertical and diagonal directions. The photoreceptor surface of the CCD 10 is formed by color filters arrayed in this fashion.

Further, the block 20 can be considered to be a group of four sub-blocks 21 to 24 each consisting of three optoelectronic transducers 11 in each of the horizontal and vertical directions. Color filters formed on the photoreceptor surfaces of the optoelectronic transducers 11 at the center of sub-block 21 and along the diagonal directions through this center are the green filters G. Color filters formed on the photoreceptor surfaces of the optoelectronic transducers 11 on both sides of the center of sub-block 21 along the horizontal direction are the red filters R, and color filters formed on the photoreceptor surfaces of the optoelectronic transducers 11 on both sides of the center of sub-block 21 along the vertical direction are the blue filters B.

The filter array of optoelectronic transducers 11 contained in sub-block 24 situated diagonally to the lower right of sub-block 21 is identical with the filter array of sub-block 21. The filter arrays of optoelectronic transducers 11 contained in sub-block 22 situated on the right side of sub-block 21 and in sub-block 23 situated on the lower side of sub-block 21 are, with regard to the color filters G, identical with the array of green filters G formed on the optoelectronic transducers 11 contained in sub-block 21, but are the reverse with regard to the red filters R and blue filters B in sub-block 21. That is, in sub-blocks 22 and 23, the red filters R are formed on the photoreceptor surfaces of optoelectronic transducers 11 on both sides of the center optoelectronic transducer 11 along the vertical direction, and the blue filters B are formed on the photoreceptor surfaces of optoelectronic transducers 11 on both sides of the center optoelectronic transducer 11 along the horizontal direction.

When a subject is imaged using the CCD 10 having the array of color filters shown in FIG. 1, the precision of reproducibility of interpolation processing in the high-frequency region can be improved because the pixels that constitute the image of the subject obtained by imaging contain green components along each of the horizontal, vertical and diagonal directions. Similarly, the occurrence of false colors can be prevented since red and blue components are included along each of the horizontal and vertical directions.

In the array of color filters shown in FIG. 1, block 20 contains portions in which two of the green filters G are contiguous in all of the horizontal, vertical and diagonal directions. Further, block 20 also contains portions in which two of the green filters G each are contiguous in the horizontal and vertical directions.

Figure 2:
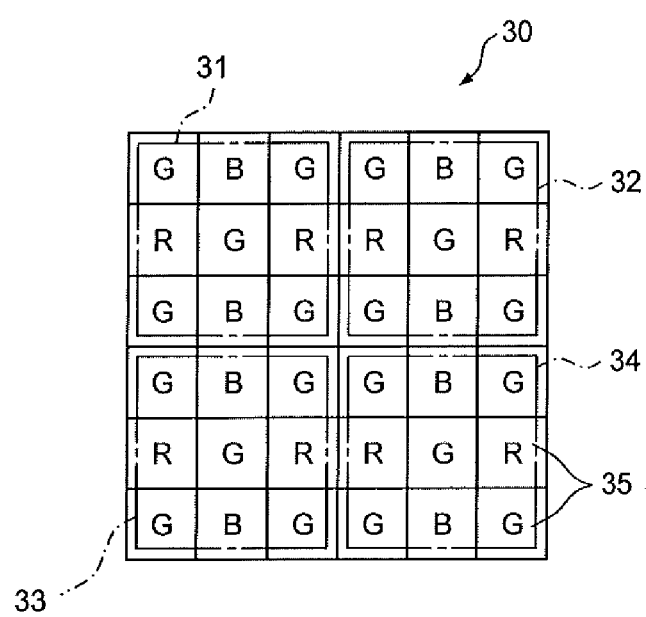
FIG. 2 illustrates a portion of an image.

FIG. 2 is an example of an image (a portion thereof) obtained by subsampling processing, which is executed in the CCD 10 having the array of color filters described above, for extracting every other pixel (odd-numbered) along each of the horizontal and vertical directions from an image obtained by imaging a subject.

An image portion 30 consists of six pixels 35 along each of the horizontal and vertical directions. The image portion 30 corresponds to the block 20 shown in FIG. 1. The image portion 30 consists of four sub-blocks 31 to 34 of three pixels each along each of the horizontal and vertical directions. The sub-blocks 31 to 34 are such that pixels 35 having the green component are all situated at the centers of the sub-blocks and along the diagonal directions through these centers. The pixels on both sides of the center green-component pixel 35 along the horizontal direction are pixels 35 having the red component, and the pixels on both sides of the center green-component pixel 35 along the vertical direction are pixels 35 having the blue component.

As will be understood if the image portion 30 shown in FIG. 2 and the block 20 shown in FIG. 1 are compared, the placement of the blue filters B and the placement of the red filters R are the reverse of each other in the sub-blocks that are mutually adjacent along the horizontal direction and along the vertical direction in block 20 shown in FIG. 1, whereas the placement of the blue filters B and the placement of the red filters R are the same, irrespective of the sub-blocks 31 to 34, in the image portion 30 shown in FIG. 2.

Even in the image shown in FIG. 2 obtained by executing subsampling processing, which is executed in the CCD 10 having the array of color filters shown in FIG. 1, for extracting every other pixel along each of the horizontal and vertical directions from the image obtained by imaging the subject, the precision of reproducibility of interpolation processing in the high-frequency region can be improved because green components are contained along each of the horizontal, vertical and diagonal directions. The reproducibility of interpolation processing can be improved even with regard to an image that has been subjected to subsampling processing as by raising the frame rate.

The image portion 30 shown in FIG. 2 is obtained by subsampling pixels in odd-numbered rows and odd-numbered columns. However, even if pixels in even-numbered rows and even-numbered columns, odd-numbered rows and even-numbered column or even-numbered rows and odd-numbered columns are subsampled, a subsampled image containing green components along each of horizontal, vertical and diagonal directions in an image portion of 6 pixels×6 pixels will be obtained in a manner similar to that of the image portion shown in FIG. 2.

Figure 3:
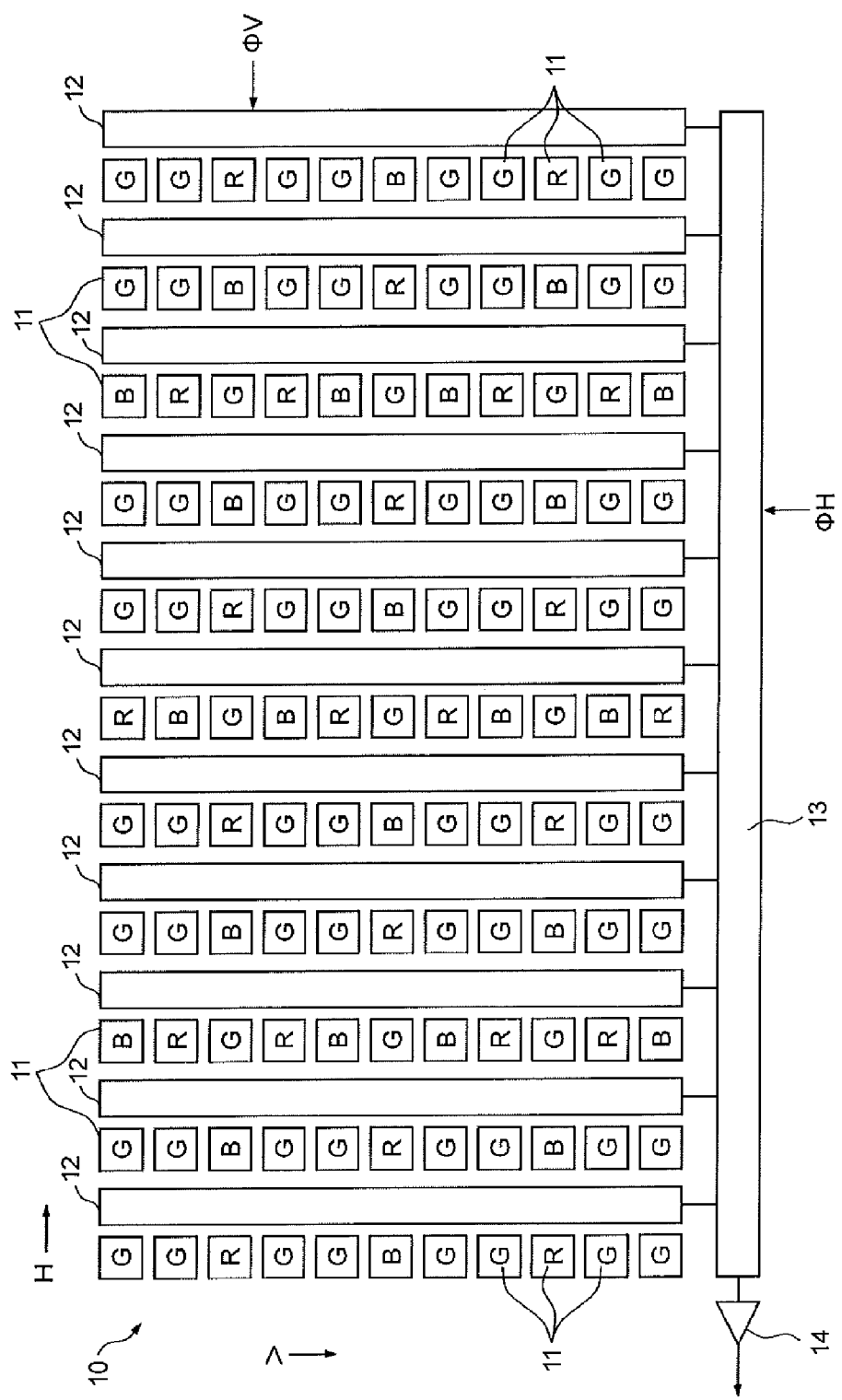
FIG. 3 illustrates part of the photoreceptor surface of a CCD.

FIG. 3 illustrates part of the photoreceptor surface of the CCD 10 shown in FIG. 1. Here it will be seen that, in comparison with FIG. 1, vertical transfer lines 12, a horizontal transfer line 13 and an amplifying circuit 14 have been added on.

As mentioned above, a number of the optoelectronic transducers 11 are arrayed in the horizontal direction (indicated by arrow H) and vertical direction (indicated by arrow V). Further, formed on the photoreceptor surfaces of these optoelectronic transducers 11 are any one of a red filter R, green filter G and blue filter B. The array of color filters is the same as that shown in FIG. 1.

The vertical transfer lines 12, which vertically transfer signal charge that has accumulated in the optoelectronic transducers 11, are arrayed on the right side (or left side) of respective ones of the columns of optoelectronic transducers 11. The horizontal transfer line 13, which horizontally transfers signal charge that has been transferred from the vertical transfer lines 12, is provided on the lower side of the vertical transfer lines 12. The amplifying circuit 14 is connected to the output side of the horizontal transfer line 13.

By exposing the optoelectronic transducers 11 to light, signal charge accumulates in the optoelectronic transducers 11. Signal charge representing pixels of the red, green or blue components accumulates in the optoelectronic transducers 11 on which the red filters R, green filters G or blue filters B have been formed. The signal charge that has accumulated in the optoelectronic transducers 11 is shifted to the vertical transfer lines 12 by application of a shift pulse to the optoelectronic transducers 11. The signal charge thus shifted to the vertical transfer lines 12 is transferred in the vertical direction by application of a vertical-transfer pulse φV to the vertical transfer lines 12, and the signal charge that has been transferred through the vertical transfer lines is applied to the horizontal transfer line 13 by application of a shift pulse. The signal charge applied to the horizontal transfer line 13 is transferred in the horizontal direction by application of a horizontal transfer pulse φH. The signal charge that has been transferred in the horizontal direction is output from the CCD 10 as a video signal upon amplification via the amplifying circuit 14.

If a shift pulse is applied to the optoelectronic transducers 11 of odd-numbered rows but not to the optoelectronic transducers 11 of even-numbered rows, only the signal charge that has accumulated in the optoelectronic transducers 11 of the odd-numbered rows is shifted to the vertical transfer lines 12. As a result, ½ subsampling (extraction of every other pixel) is achieved along the vertical direction. Further, by applying a shift pulse only to the vertical transfer lines 12 of odd-numbered rows in such a manner that only signal charge that has been transferred through the vertical transfer lines 12 of odd-numbered rows is transferred to the horizontal transfer line 13 and signal charge that has been transferred through the vertical transfer lines 12 of even-numbered rows is not transferred to the horizontal transfer line 13, ½ subsampling is achieved along the horizontal direction. Thus, a video signal representing an image that has been subsampled to ½ (an image obtained by extracting every other pixel) in each of the horizontal and vertical directions is output from the CCD 10.

In the above-described embodiment, subsampling processing is executed in the solid-state electronic image sensing device 10. However, it may be arranged so that subsampling processing is applied to the video signal, which is output from the solid-state electronic image sensing device 10, without executing subsampling processing in the solid-state electronic image sensing device 10. In such case, a video signal equivalent to one image that has been output from the solid-state electronic image sensing device 10 would be stored in a memory and the video signal would be read out of the memory every other pixel along the horizontal and vertical directions.

A method of executing interpolation processing with regard to an image subsampled as shown in FIG. 2 will now be described.

Figure 4:
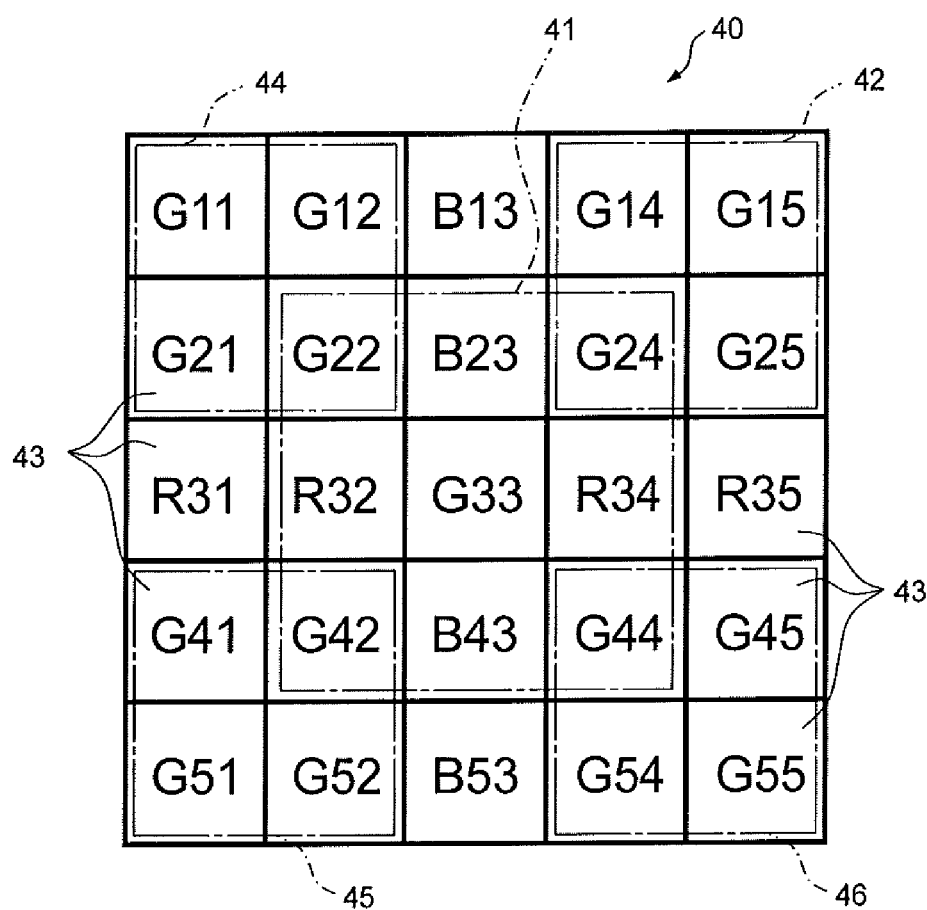
FIG. 4 illustrates a portion of an image.

FIG. 4 illustrates an image portion 40 obtained by executing subsampling processing in the manner set forth above. In order to facilitate understanding, numerals have been appended to the right side of each R, G or B character in FIG. 4. Character R represents a red filter, G a green filter and B a blue filter, which is similar to the arrangement described above.

The image portion 40 has five pixels in each of the horizontal and vertical directions (though it goes without saying that the number of pixels need not be five each). Within the image portion 40, consider a central sub-block 41 comprising three pixels along each of the horizontal and vertical directions, and a direction discrimination sub-block 42, which is at the upper right, comprising three pixels along each of the horizontal and vertical directions.

Figure 5:
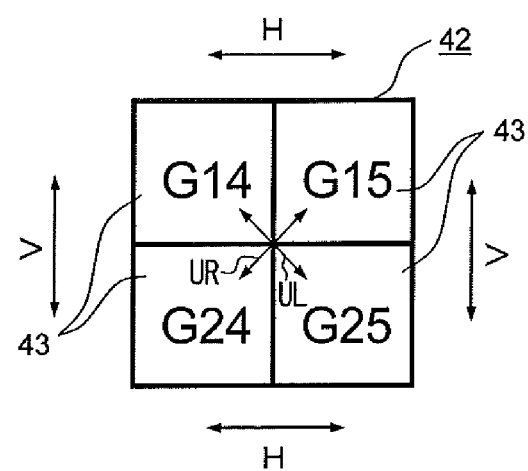
FIG. 5 illustrates a direction discrimination block.

FIG. 5 illustrates the direction discrimination sub-block 42.

The direction discrimination sub-block 42 includes four pixels G14, G15, G24 and G25. These pixels G14, G15, G24 and G25 each have the green component but not the blue and red components. In this embodiment, the absolute value of the difference between the levels of the pixels G14, G15, G24 and G25 is calculated along each of the horizontal (indicated by arrow H), vertical (indicated by arrow V) and diagonal directions, and the direction along which the calculated absolute value of the differences is smallest is decided upon as a correlation direction. If we let the levels of these pixels G14, G15, G24 and G25 also be represented by pixels G14, G15, G24 and G25, then the absolute value of the difference along the vertical direction will be (|G14−G24|+|G15−G25|)/2, the absolute value of the difference along the horizontal direction will be (|G14−G15|+|G24−G25|)/2, the absolute value of the difference along the upper-right diagonal direction (indicated by arrow UR) will be |G15−G24|, and the absolute value of the difference along the upper-left diagonal direction (indicated by arrow UL) will be |G14−G25|.

If, with reference to FIG. 4, the upper-right diagonal direction is discriminated to be the correlation direction by utilizing the direction discrimination sub-block 42, then the green component of pixel B23 contained in sub-block 41 is interpolated using the pixel G14 contained in the direction discrimination sub-block 42, and the green component of pixel R34 contained in sub-block 41 is interpolated using the pixel G25. If the horizontal direction is discriminated to be the correlation direction by utilizing the direction discrimination sub-block 42, then the green component of pixel B23 contained in sub-block 41 is interpolated using the pixel G24 contained in the direction discrimination sub-block 42, and the green component of pixel R34 contained in sub-block 41 is interpolated using the pixel G33. If the vertical direction is discriminated to be the correlation direction by utilizing the direction discrimination sub-block 42, then the green component of pixel B23 contained in sub-block 41 is interpolated using the pixel G33, and the green component of pixel R34 contained in sub-block 41 is interpolated using the pixel G24 contained in the direction discrimination sub-block 42.

Further, in each of direction discrimination sub-blocks 42, 44, 45 and 46 located at the four corners in FIG. 4 and each comprising 2×2 pixels, the absolute values of the differences along the horizontal, vertical, upper-left and upper-right diagonal directions are calculated, the sum total (average) of the calculated absolute values of the differences is calculated according to direction and the direction along which the obtained sum total (average) is smallest may be adopted as the correlation direction.

In the foregoing embodiment, the green component of the blue pixel B23 and the green component of the red pixel R34 are interpolated, but the red component of the blue pixel B23 and the blue component of the red pixel R34 are not. The red component of the blue pixel B23 is interpolated using the red pixel R32 (or R34) in the vicinity of the blue pixel B23 and the green component that was obtained by interpolation. More specifically, if we let R23 be the red component of the blue pixel B23 and let G23 be the green component obtained by interpolation, then R23 is obtained by R23=G23+(R32−G32), where G32 is the green component of pixel R32 obtained by interpolation. Naturally, it may be arranged to interpolate the red component R23 of the blue pixel B23 using both of the red pixels R32 and R34 in the vicinity of the blue pixel B23. For example, R23 is obtained by R23=G23+{(R32+R34)/2−(G32+G34)/2}, where G34 is the green component interpolated at red pixel R34.

It goes without saying that red and blue components can be interpolated similarly with regard to the green pixel.

The above-described interpolation processing will be summarized as set forth below.

The method of interpolating the pixel value of a pixel of interest based upon the color difference relative to a neighboring pixel and calculating the pixel value of another color is as follows:

Let a pixel of interest to undergo interpolation processing be a green pixel G, and let this pixel value be G. Further, in a case where a red pixel R or a blue pixel B does not exist along the discriminated correlation direction, pixel values RG, BG of a red component R and blue component B at the position of the pixel to be interpolated are obtained from Equation 1 as follows:

$$RG=G+(R-GR), BG=G+(B-GB) \quad \text{Equation 1}$$

where R, B represent the pixel values of a red pixel R and blue pixel B in the vicinity of the green pixel G, and GR, GB represent the pixel values of green pixels G at the pixel positions of these pixels.

Similarly, in a case where a pixel of interest to undergo interpolation processing is a red pixel R, the pixel value thereof is R and a green pixel G or blue pixel B does not exist along the discriminated correlation direction, pixel values GR, BR of a green component G and blue component B at the pixel to be interpolated are obtained from Equation 2 as follows:

$$GR=R+(G-RG), BR=R+(B-RB) \quad \text{Equation 2}$$

where G, B represent the pixel values of a green pixel G and blue pixel B in the vicinity of a red pixel R, and RG, RB represent the pixel values of red pixels R at the pixel positions of these pixels.

Further, in a case where a pixel of interest to undergo interpolation processing is a blue pixel B, the pixel value thereof is B and a green pixel G or red pixel R does not exist along the discriminated correlation direction, pixel values GB, RB of a green component G and red component R of the pixel to be interpolated are obtained from Equation 3 as follows:

$$GB=B+(G-BG), RB=B+(R-BR) \quad \text{Equation 3}$$

where G, R represent the pixel values of a green pixel G and red pixel R in the vicinity of a blue pixel B, and BG, BR represent the pixel values of blue pixels B at the pixel positions of these pixels.

Further, in the foregoing embodiment, it is arranged so that in a case where, with respect to a pixel of interest to undergo interpolation processing, a pixel of another color does not exist in the discriminated correlation direction, the pixel value of the pixel of interest is interpolated based upon the color difference relative to a neighboring pixel of another color and the pixel value of the other color is calculated. However, this does not impose a limitation and, as set forth next, it may be arranged to interpolate the pixel value of a pixel of interest based upon a color comparison with a neighboring pixel of another color and calculate the pixel value of the other color.

In a case where a pixel of interest to undergo interpolation processing is a green pixel G, the pixel value thereof is G and a red pixel R or blue pixel B does not exist along the discriminated correlation direction, pixel values RG, BG of a red component R and blue component B at the position of the pixel of interest are obtained from Equation 4 as follows:

$$RG=G\times(R/GR), BG=G\times(B/GB) \quad \text{Equation 4}$$

where R, B represent the pixel values of a red pixel R and blue pixel B in the vicinity of a green pixel G, and GR, GB represent the pixel values of green pixels G at the pixel positions of these pixels.

Similarly, in a case where a pixel of interest to undergo interpolation processing is red R, the pixel value thereof is R and a green pixel G or blue pixel B does not exist along the discriminated correlation direction, pixel values GR, BR of a green component G and blue component B at the position of the pixel of interest are obtained from Equation 5 as follows:

$$GR=R\times(G/RG), BR=R\times(B/RB) \qquad \text{Equation 5}$$

where G, B represent the pixel values of a green pixel G and blue pixel B in the vicinity of a red pixel R, and RG, GB represent the pixel values of red pixels R at the pixel positions of these pixels.

Further, a case where a pixel of interest to undergo interpolation processing is a blue pixel B, the pixel value thereof is B and a green pixel G or red pixel R does not exist along the discriminated correlation direction, pixel values GB, RB of a green component G and red component R at the position of the pixel to be interpolated are obtained from Equation 6 as follows:

$$GB=B\times(G/BG), RB=B\times(R/BR) \qquad \text{Equation 6}$$

where G, R represent the pixel values of a green pixel G and red pixel R in the vicinity of a blue pixel B, and BG, BR represent the pixel values of blue pixels B at the pixel positions of these pixels.

Figure 6:
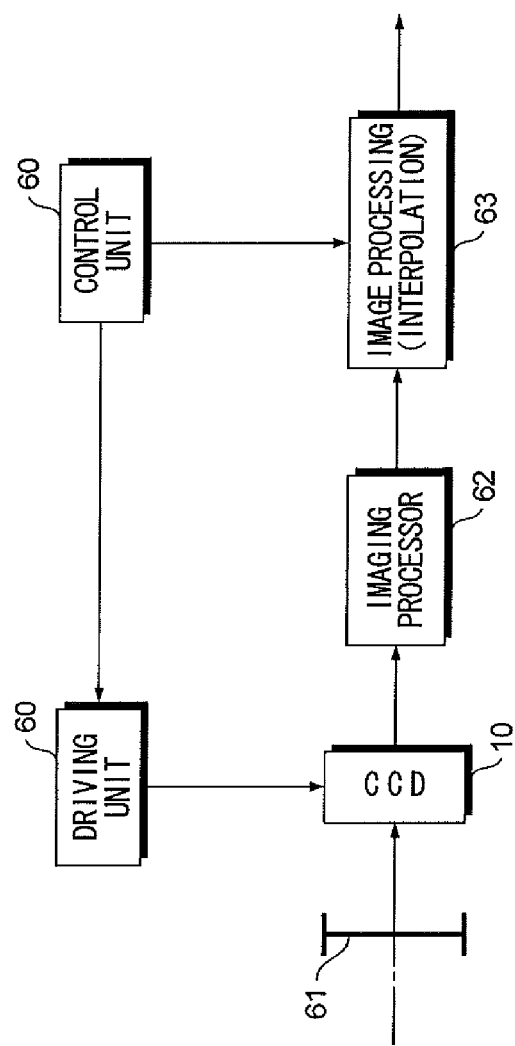
FIG. 6 illustrates part of the electrical configuration of a digital camera.

FIG. 6 is a block diagram illustrating part of the electrical configuration of a digital camera (inclusive of a digital still camera, digital movie camera and mobile telephone provided with the function of a digital camera).

The overall operation of the movie camera is controlled by a control unit 60.

The image of a subject is formed on the photoreceptor surface of the above-mentioned CCD 10 by an imaging lens 61. The CCD 10 is driven by a driving unit 64. The driving unit 64 applies pulses such as the shift pulse, vertical transfer pulse φV and horizontal transfer pulse φH to the CCD 10 so as to execute subsampling processing as described above.

A subsampled video signal is output from the CCD 10 and is input to an imaging processor 62. The imaging processor 62 executes predetermined imaging processing such as an analog/digital conversion, gamma correction and white balance adjustment. As mentioned above, it may be arranged so that subsampling processing is executed in the imaging processor 62 and not in the CCD 10. In such case the imaging processor 62 would include a memory for storing image data temporarily and subsampling processing would be executed, as set forth above, when the image data is read out of the memory.

The image data that has been output from the imaging processor 62 is input to an image processing unit 63. Direction discrimination and the like are executed, as set forth above, in the image processing unit 63 and interpolation processing is executed in accordance with the discriminated direction. Interpolated color image data is output from the image processing unit 63. It should be noted that in the foregoing embodiment, it is possible to apply interpolation processing based upon a correlation direction, which has been discriminated by the above-described direction discrimination processing, not only to a subsampled image but also to a high-resolution image prior to the subsampling thereof.

Figure 7:
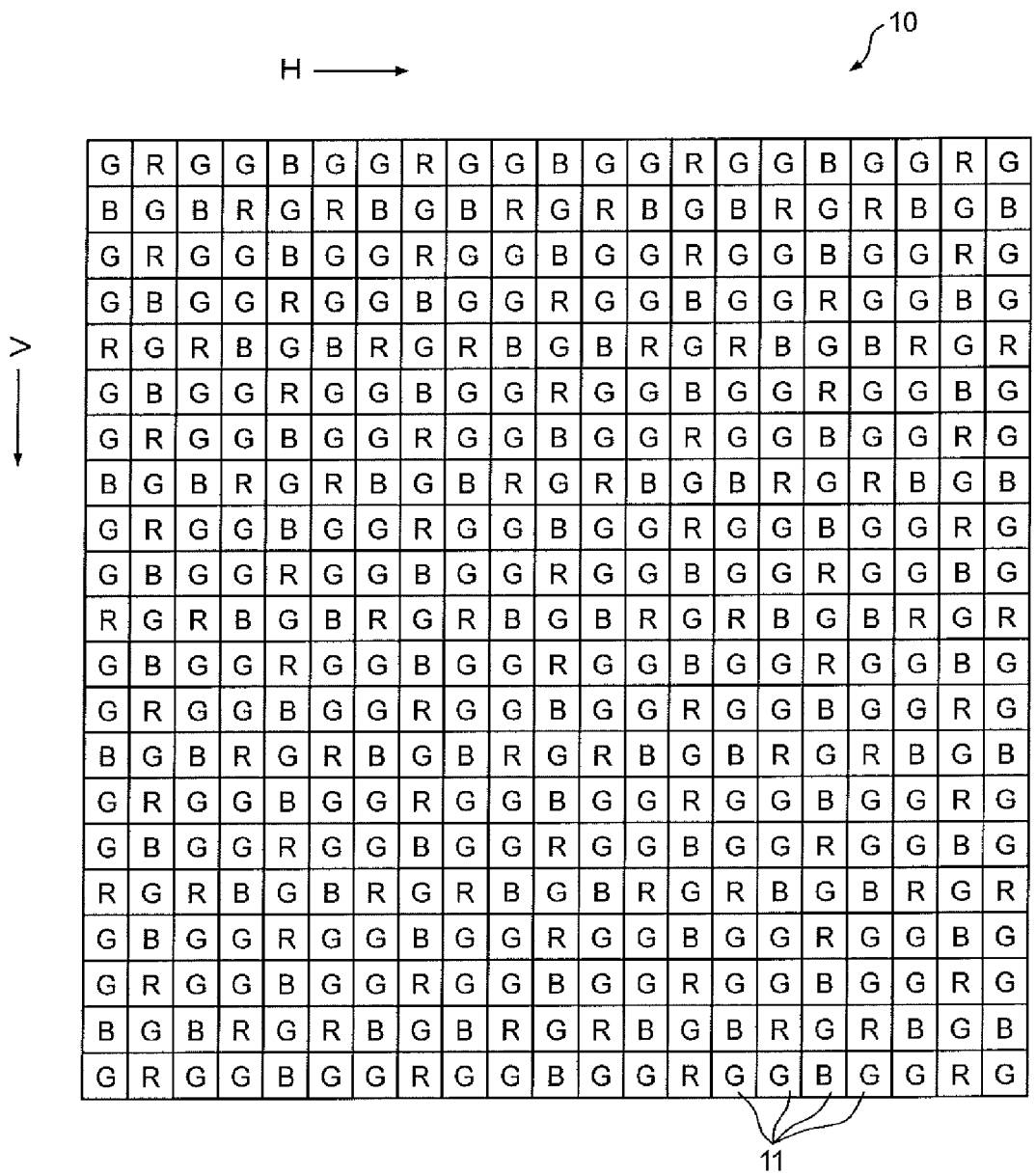
FIG. 7 illustrates part of the photoreceptor surface of a CCD.
Figure 8:
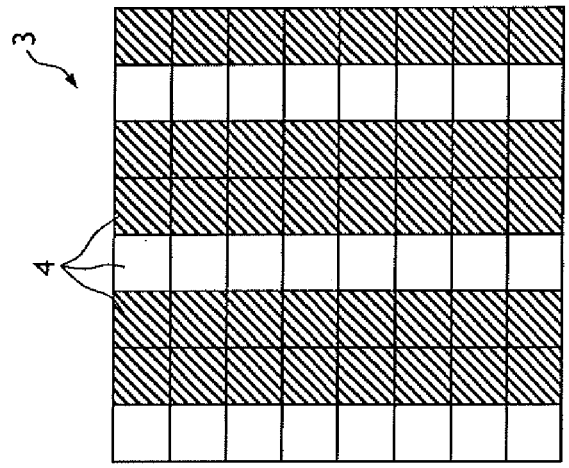
FIG. 8a illustrates part of the photoreceptor surface of a solid-state electronic image sensing device.
FIGS. 8b and 8c illustrate parts of images.
Figure 9:
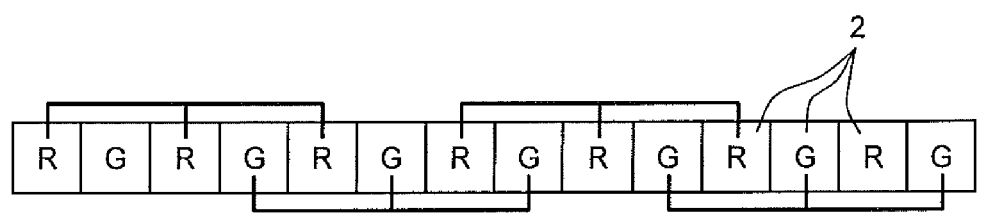
FIG. 9 illustrates a mixture of pixels.
Figure 10A:
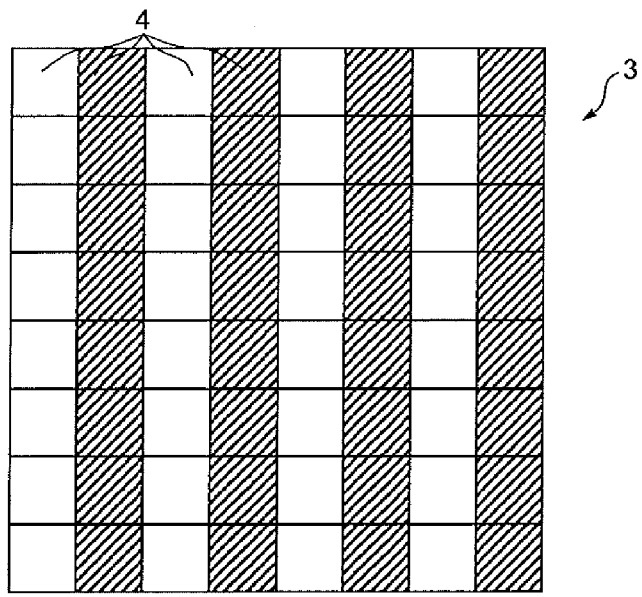
FIGS. 10a to 10c illustrate parts of images.
Figure 10B:
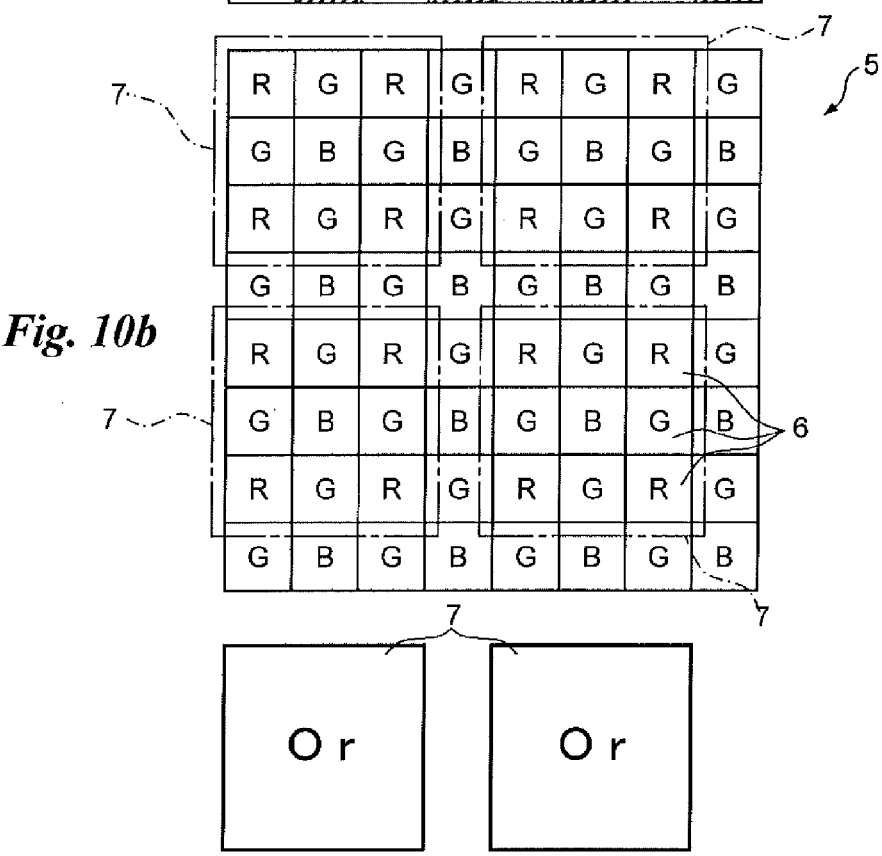
Figure 10C:
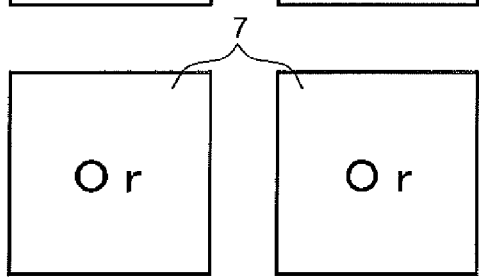

FIG. 7 illustrates part of the photoreceptor surface of the CCD 10.

In the above-described embodiment, ½ subsampling along the horizontal direction and ½ subsampling along the vertical direction is implemented by extracting every other pixel in each of the horizontal and vertical directions. However, ¼ subsampling along the horizontal direction and ¼ subsampling along the vertical direction can be implemented by extracting a pixel every other three pixels in each of the horizontal and vertical directions.

The photoreceptor surface shown in FIG. 7 includes a number of the optoelectronic transducers 11 having an array of color filters the same as that of the CCD 10 shown in FIG. 1. A subsampled image having the color array shown in FIG. 2 is obtained by executing ¼ subsampling along the horizontal direction (indicated by arrow H) and ¼ subsampling along the vertical direction (indicated by arrow V).

Thus, by extracting a pixel every other odd number of pixels along the horizontal and vertical directions, an image having the color array shown in FIG. 2 is obtained even if subsampling processing is executed.

The invention claimed is:

1. An image sensing apparatus comprising:

a solid-state electronic image sensing device having a number of optoelectronic transducers arrayed in horizontal and vertical directions, wherein color filters having filter characteristics for transmitting a light component of any color among colors red, green and blue or a light component of any color among colors cyan, magenta and yellow are formed on photoreceptor surfaces of said optoelectronic transducers, the number of said optoelectronic transducers on the photoreceptor surfaces of which the color filters having the filter characteristic for transmitting the green light component are formed is greater than the number of said optoelectronic transducers on the photoreceptor surfaces of which the color filters having the filter characteristic for transmitting the red light component are formed or the number of said optoelectronic transducers on the photoreceptor surfaces of which the color filters having the filter characteristic for transmitting the blue light component are formed, or the number of said optoelectronic transducers on the photoreceptor surfaces of which the color filters having the filter characteristic for transmitting the yellow light component are formed is greater than the number of said optoelectronic transducers on the photoreceptor surfaces of which the color filters having the filter characteristic for transmitting the cyan light component are formed or the number of said optoelectronic transducers on the photoreceptor surfaces of which the color filters having the filter characteristic for transmitting the magenta light component are formed, and in a block consisting of six of said optoelectronic transducers in each of the horizontal and vertical directions, at least one each of a color filter having a filter characteristic for transmitting a green light component, a color filter having a filter characteristic for transmitting a blue light component and a color filter having a filter characteristic for transmitting a red light component, or at least one each of a color filter having a filter characteristic for transmitting a yellow light component, a color filter having a filter characteristic for transmitting a cyan light component and a color filter having a filter characteristic for transmitting a magenta light component, are formed in all horizontal and vertical directions and, by repeating this block periodically, color filters having a filter characteristic for transmitting a green light component or a yellow light component are formed diagonally, signal charge that has accumulated in the optoelectronic transducers being output as a video signal; and a driving circuit for driving said solid-state electronic image sensing device so as to output, from within the video signal that is output from said solid-state electronic image sensing device, a video signal obtained based upon signal charge that has accumulated in every other odd-numbered one of said optoelectronic transducers in each of the horizontal and vertical directions.

2. An image sensing apparatus according to claim 1, wherein said block is a group of four sub-blocks each consisting of three of said optoelectronic transducers in each of the horizontal and vertical directions; and from among the color filters formed on the photoreceptor surfaces of said optoelectronic transducers, an array of color filters having a characteristic for transmitting a red or cyan light component and an array of color filters having a characteristic for transmitting a blue or magenta light component are the reverse of each other in sub-blocks adjacent in the horizontal direction and in the vertical direction.

3. An image sensing apparatus according to claim 1, wherein there is included at least one portion in which two color filters, which have a characteristic for transmitting a green or yellow light component, formed on the photoreceptor surfaces of said optoelectronic transducers contained in the block are contiguous in all of the horizontal, vertical and diagonal directions.

4. An image sensing apparatus according to claim 3, wherein there is included at least one portion in which two color filters each, which have a characteristic for transmitting a green or yellow light component, formed on the photoreceptor surfaces of said optoelectronic transducers contained in the block are contiguous in the horizontal and vertical directions.

5. An image sensing apparatus according to claim 4, further comprising:

a correlation direction detection device for detecting a correlation direction from pixel levels of four pixels obtained based upon a portion in which two of the color filters each, which have a characteristic for transmitting a green or yellow light component, formed on the photoreceptor surfaces of the optoelectronic transducers contained in said block are contiguous in the horizontal and vertical directions;

an interpolation device for interpolating a green or yellow component of a pixel having a red, cyan, blue or magenta component, which exists in the interpolation direction detected in said interpolation direction detection device, by using pixels having a green or yellow component that exists in the interpolation direction detected in said interpolation direction detection device; and a control device for repeating processing by said interpolation direction detection device and processing by said interpolation device with regard to one image portion.

6. An image sensing apparatus according to claim 5, wherein said correlation direction detection device calculates an absolute value of a difference between pixel levels of adjacent pixels in every one of the horizontal, vertical and diagonal directions and decides that a direction along which the sum total or average value of the absolute values of the differences in every direction is smallest is the correlation direction.

7. An image sensing apparatus according to claim 5, wherein said interpolation device interpolates a color component, which does not have a color component among pixels having the red, cyan, blue or magenta color component, from a green or yellow color component interpolated by said interpolation device and a color component having a color component among the red, cyan, blue or magenta color component.

8. An image sensing apparatus according to claim 3, wherein the optoelectronic transducers on which the color filters having the characteristic for transmitting the green or yellow light component are formed have equal sensitivities.

9. A method of controlling operation of an image sensing apparatus, comprising:

outputting, from a solid-state electronic image sensing device having number of optoelectronic transducers arrayed in horizontal and vertical directions, signal charge, which has accumulated in the optoelectronic transducers, as a video signal, wherein color filters having a filter characteristic for transmitting a light component of any color among colors red, green and blue or a light component of any color among colors cyan, magenta and yellow are formed on photoreceptor surfaces of the optoelectronic transducers, the number of the optoelectronic transducers on the photoreceptor surfaces of which the color filters having the filter characteristic for transmitting the green light component are formed is greater than the number of the optoelectronic transducers on the photoreceptor surfaces of which the color filters having the filter characteristic for transmitting the red light component are formed or the number of the optoelectronic transducers on the photoreceptor surfaces of which the color filters having the filter characteristic for transmitting the blue light component are formed, or the number of the optoelectronic transducers on the photoreceptor surfaces of which the color filters having the filter characteristic for transmitting the yellow light component are formed is greater than the number of the optoelectronic transducers on the photoreceptor surfaces of which the color filters having the filter characteristic for transmitting the cyan light component are formed or the number of the optoelectronic transducers on the photoreceptor surfaces of which the color filters having the filter characteristic for transmitting the magenta light component are formed, and in a block consisting of six of the optoelectronic transducers in each of the horizontal and vertical directions, at least one each of a color filter having a filter characteristic for transmitting a green light component, a color filter having a filter characteristic for transmitting a blue light component and a color filter having a filter characteristic for transmitting a red light component, or at least one each of a color filter having a filter characteristic for transmitting a yellow light component, a color filter having a filter characteristic for transmitting a cyan light component and a color filter having a filter characteristic for transmitting a magenta light component, are formed in all horizontal and vertical directions and, by repeating this block periodically, color filters having a filter characteristic for transmitting a green light component or a yellow light component are formed diagonally; and outputting by driving the solid-state electronic image sensing device with a driving circuit, from within the video signal that is output from the solid-state electronic image sensing device, a video signal obtained based upon signal charge that has accumulated in every other odd-numbered one of the optoelectronic transducers in each of the horizontal and vertical directions.

* * * * *